United States Patent [19]
McComb

[11] Patent Number: 5,341,765
[45] Date of Patent: Aug. 30, 1994

[54] PROTECTIVE GARMENT FOR ANIMAL FRONT LEGS

[76] Inventor: Darlene D. McComb, 3011 E. Funston, Wichita, Kans. 67211

[21] Appl. No.: 61,158

[22] Filed: May 13, 1993

[51] Int. Cl.$^5$ .............................................. A01K 13/00
[52] U.S. Cl. ..................................... 119/850; 54/79.2
[58] Field of Search ................ 119/143, 96, 850, 856; 54/79.1, 79.2, 80.1, 82, 65, 68; 602/62, 63; 128/889, 891, 892; 2/22, 23, 24, 62

[56] References Cited

U.S. PATENT DOCUMENTS

| | | | |
|---|---|---|---|
| 2,136,115 | 11/1938 | McCaleb | 54/80.1 |
| 2,443,831 | 6/1948 | Miller | 54/79.1 |
| 2,645,222 | 7/1953 | Capossela | 602/62 |
| 3,747,565 | 7/1973 | Kellam | 54/82 |
| 3,791,383 | 2/1974 | Friedman | 128/154 |
| 3,918,238 | 11/1975 | Iozzio | 119/143 |
| 4,479,457 | 10/1984 | Rotolo | 119/143 |
| 4,510,888 | 4/1985 | DeAngelis et al. | 119/143 |
| 4,744,333 | 5/1988 | Taylor | 119/96 |
| 5,033,124 | 7/1991 | Bucallo et al. | 2/22 |

Primary Examiner—Paul J. Hirsch
Assistant Examiner—Todd E. Manahan
Attorney, Agent, or Firm—John R. Flanagan

[57] ABSTRACT

A protective garment for the front legs of an animal includes an upper elongated back strap, a pair of leg holsters and a lower chest strap. The back strap is fittable over the back and shoulders of the animal. The leg holsters are attached to opposite ends of the back strap and are of conically tapered shapes so as to be fittable over the front knees and adjacent upper and lower front leg areas of the animal so as to prevent such areas from direct contact with a surface upon which the animal may be lying prone for substantial periods of time. The chest strap is extendable under the chest of the animal behind the front legs thereof and is connectable to the back strap adjacent to the opposite ends thereof.

12 Claims, 1 Drawing Sheet

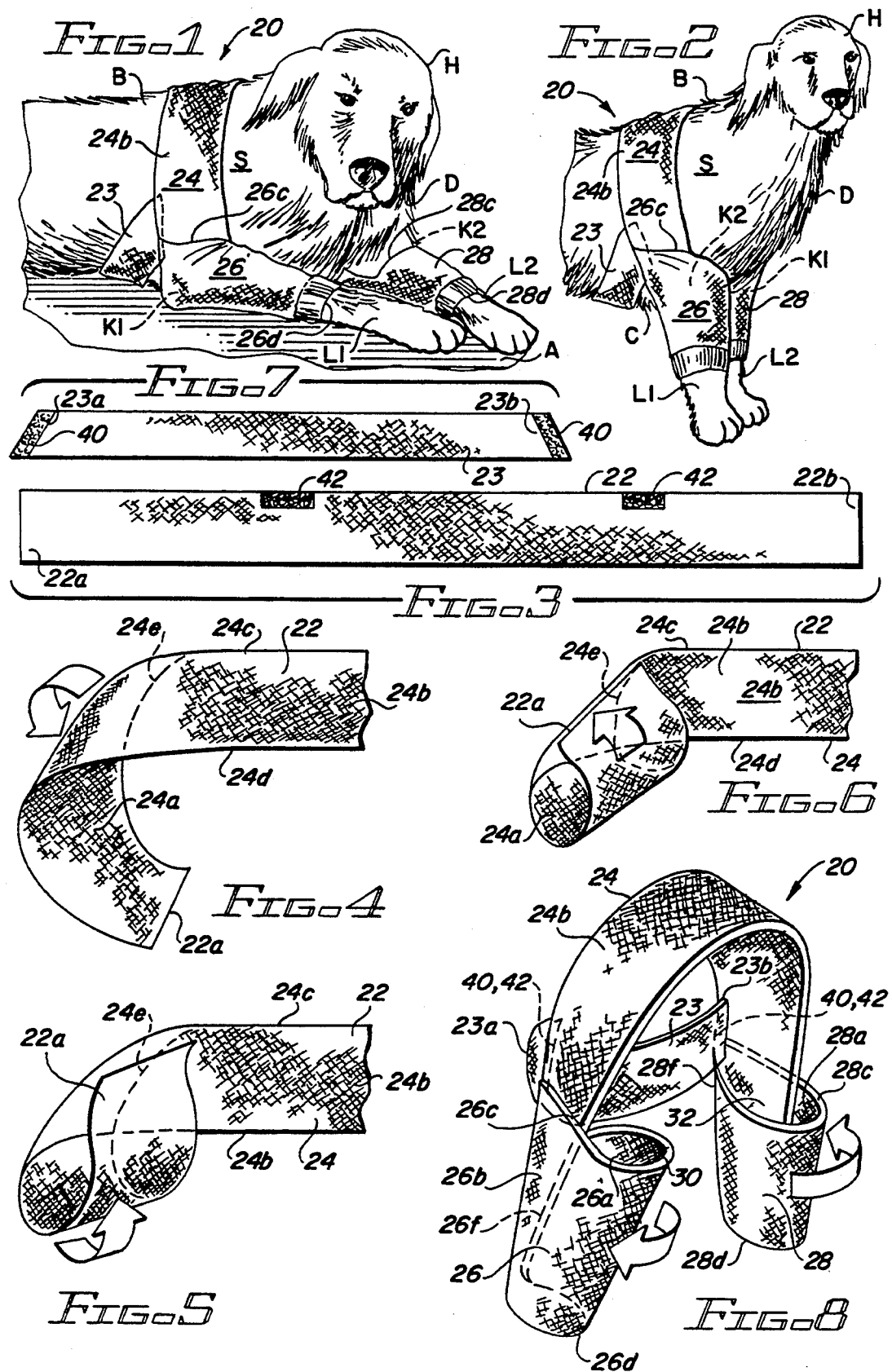

PROTECTIVE GARMENT FOR ANIMAL FRONT LEGS

BACKGROUND OF THE INVENTION

1. Field of the Invention

The present invention generally relates to animal protective devices and, more particularly, is concerned with a protective garment for an animal's front legs.

2. Description of the Prior Art

Household pets often demonstrate a proclivity towards particular types of physical problems due to their generally sedentary way of life. For example, certain types of injuries, such as calluses, often develop on a dog's knee or leg areas due to the dog's lying prone on a hard surface, such as a cement or wood floor, for a substantial part of the day. Additionally, a dog may suffer significant hair loss due to the continual rubbing of its leg areas against a rug or other floor surface.

A number of devices have been specifically developed to treat injuries such as calluses and other wounds typically incurred by a pet as hereinbefore described. Some representative examples of such devices are disclosed in U.S. Pat. to Friedman (No. 3,791,383), Rotolo (No. 4,479,457), and DeAngelis et al (No. 4,510,888).

The Friedman and DeAngelis et al devices each basically includes a tubular member for enclosing the knee and adjacent leg areas of the pet. The Rotolo device is a more specifically limited protector for the knee area of the pet. Each of these devices has inner features which support the application of medication to the wounded area of the pet. Further, each device is configured so as to inhibit the pet's ability to remove the device. The pet is thereby prevented from licking the medication off the wound or from nipping at the wound itself.

None of these devices, however, is specifically targeted towards the prevention of calluses and other wounds from developing on pets. Nor are they particularly focused on inhibiting the loss of pet hair from the pet's leg areas due to their continual rubbing against flat household surfaces. Consequently, a need exists for a protective garment of simple design and construction, for the inexpensive fabrication thereof and for ease in wearing by a household pet. The garment should be made of a stretchable, durable, machine-washable fabric with a cushioning texture for comfortable, frequent, repeated wear by the pet. The garment should further be of such design as to enclose the knees and adjacent upper and lower leg portions of an animal sufficiently to prevent direct contact of these areas with rug or floor surfaces. Rather, the texture of the garment fabric should provide a cushiony layer between the animal's vulnerable areas and rug and floor surfaces so as to minimize the potential for callus development or for pet hair loss from such areas.

SUMMARY OF THE INVENTION

The present invention provides a protective garment for an animal's front legs which is designed to satisfy the aforementioned need by avoiding the drawbacks of the prior art without introducing other drawbacks. Instead, the protective garment of the present invention provides expanded capabilities not available in the prior art devices.

One capability is simplicity in design and construction of the protective garment for inexpensive fabrication and for ease in wearing by a household pet, such as a dog. A second capability is stretchability of the garment for the comfort and frequent wear by the pet. A third capability is the extended coverage and cushioning effect provided by the protective garment for the pet's vulnerable knee and adjacent front leg areas when the pet is lying down prone on a rug or floor surface. Such coverage and cushioning of these areas prevents the development of calluses and other wounds thereon and minimizes pet hair loss therefrom often incurred through continual rubbing of these vulnerable areas against a rug or floor surface.

Accordingly, the present invention is directed to a a protective garment for an animal's front legs. The protective garment comprises: (a) means for fitting over the back and shoulders of an animal; (b) a pair of leg holsters attached to opposite ends of the fitting means and being of conically tapered shape so as to be fittable over the front knees and adjacent upper and lower front leg areas of the animal so as to prevent such areas from direct contact with rugs or floor surfaces upon which the animal may lie prone for substantial periods of time; and (c) means extendable under the chest of the animal behind the front legs thereof for interconnecting the fitting means adjacent to the opposite ends thereof.

The back and shoulders fitting means is an elongated back strap. The back strap and leg holsters are formed integrally from a blank of a continuous length of double-layered stretchable fabric, such as a knit fabric having a latex component. The latex component of the blank enhances both the stretchability and cushioning qualities of the knit fabric.

The elongated back strap formed from the blank is an elongated, double-layered sheet having inside and outside surfaces extending between opposite pairs of front and back and side edges for fitting over the back and shoulder areas of the animal. The continuous blank of fabric, from which the back strap is thereby formed, further extends between opposite end portions.

Such opposite end portions of the continuous blank of fabric are manipulated by being turned inwardly and circumferentially so as to form the conically tapered pair of leg holsters. The opposite end portions of the blank are then attached by stitching to the respective opposite side edges of the back strap so as to stabilize the conical shape of each leg holster. The pair of leg holsters thereby formed have inside and outside surfaces and extend between pairs of top and bottom and side edges.

Further, each leg holster has a central passageway extending therethrough between each pair of top and bottom edges thereof. Each conically tapered leg holster has a top edge with a circumference greater than that of the lower edge thereof. Such circumferential differences enhances the fittability of each leg holster over the front knees and adjacent upper and lower front leg portions of the animal and inhibits the potential for the bottom edges of each leg holster to slide up out of position and over the knees of the animal.

The interconnecting means being extendable under the chest of the animal is an elongated chest strap. The opposite ends of the chest strap and the opposite ends of the back strap have means for releasably fastening them together, such as complementary patches of hook and loop fastening material. The chest strap assists in holding or retaining the back strap in the desired position over the back of the animal.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a protective garment of the present invention worn by a dog lying down in a prone position on a rug or floor.

FIG. 2 is a perspective view of the protective garment worn by a dog standing up.

FIG. 3 is a plan view of the blank from which the back strap and leg holsters of the garment are formed.

FIGS. 4 to 6 are a sequence of fragmentary perspective views showing the blank of FIG. 3 being manipulated into the completed form of FIG. 7.

FIG. 7 is a plan view of the blank from which the chest strap of the garment is formed.

FIG. 8 is an enlarged perspective view of the back strap and leg holsters garment in completed form together with the connecting chest strap.

DETAILED DESCRIPTION OF THE INVENTION

Referring to the drawings and particularly to FIGS. 1, 2 and 8, there is illustrated a protective garment of the present invention, being generally designated 20, for wearing by an animal, such as a dog D, such that the knees K1, K2 and adjacent portions of the front legs L1, L2 of the dog D are protected from direct contact with rugs or with hard surfaces A, such as floors, when the dog D is lying prone on such surfaces. Such protection thereby prevents the development of calluses or other wounds on and minimizes pet hair loss from the knees K1, K2 and adjacent upper and lower portions of the animal's front legs L1, L2.

Referring particularly to FIGS. 3 and 7, the protective garment 20 is made from first and second blanks 22, 23 of continuous lengths of fabric. The first blank 22 is longer than the second blank 23. The fabric of both blanks 22, 23 is preferably a double-layered, durable, stretchable type, such as an acrylic knit having a latex component. The latex component in the acrylic knit ensures that the protective garment 20 has sufficient stretchability so as to conform comfortably with the animal's movements. Further, the cushioning qualities of such fabric thereby provides a protective layer of fabric between the dog's vulnerable leg areas and the rug or floor surface A so as to minimize pet hair loss from these areas. Also, the development of calluses or other such wounds typically incurred through direct contact of such areas with such surfaces is substantially inhibited and prevented by the protective layer of fabric.

Referring further to FIGS. 1 and 2, the protective garment 20 basically includes an upper elongated back strap 24 and a pair of leg holsters 26, 28 made from the first blank 22 of fabric. The back strap 24 is fittable over the back B and shoulders S (only one being seen) of the dog D. The pair of leg holsters 26, 28 are fittable over and around the knees K1, K2 and adjacent upper and lower portions of the legs L1, L2 above and below the knees K1, K2 of the dog D. The back strap 24 and leg holsters 26, 28 are formed integrally from the blank 22 of fabric.

Referring particularly to FIGS. 3-7, the blank 22 of fabric is placed such that the back strap 24 is formed as a continuous sheet of double-layered fabric having inside and outside surfaces 24a, 24b and extending between pairs of opposite rear and front and side edges 24c, 24d, 24e, 24f. The back strap 24 is then manipulated so as to form the pair of leg holsters 26, 28 by turning each of the opposite end portions 22a, 22b of the blank 22 inwardly and circumferentially so as to form the pair of conically-tapered leg holsters 26, 28 as seen in FIGS. 4-6.

Stitching is then applied along the opposite side edges 24e, 24f of opposite end portions 22a, 22b of the blank 22 to complete the leg holsters 26, 28. Each of the leg holsters 26, 28, so formed, includes a double-layered sheet of fabric of conical shape, having inside and outside surfaces 26a, 26b and 28a, 28b and extending between pairs of opposite top and bottom and side edges 26c, 26d, 26e, 26f and 28c, 28d, 28e, 28f. The leg holsters 26, 28 are thereby attached at their respective side edges 26e, 28e to the opposite side edges 24e, 24f of the back strap 24, and merge therefrom and are further reattached by stitching at their opposite side edges 26f, 28f to the opposite side edges 24e, 24f of the back strap 24.

The conical shape of each leg holster 26, 28 is permanently formed and stabilized by the aforementioned stitching. The leg holsters 26, 28 each further define a central passageway 30, 32 extending therethrough between each pair of opposite top and bottom edges 26c, 26d and 28c, 28d, as seen in FIG. 7. Due to the conical shape of each leg holster 26, 28, the circumference of the top edge 26c, 28c thereof is greater than the circumference of the lower edge 26d, 28d thereof. Such circumferential difference permits the leg holsters 26, 28 to be fitted smoothly around the differing circumferences of the upper and lower portions of the front legs L1, L2 above and below the knees K1, K2 of the dog D. Such fitting ensures that the leg holsters 26, 28 are stabilized in position around the front legs L1, L2 of the dog D as hereinbefore described for maximum coverage of the dog's vulnerable areas when lying prone on rug or floor surfaces.

Referring further to FIGS. 7 and 8, the protective garment 20 also includes a lower elongated chest strap 23 made from the second blank 23 of fabric. The lower chest strap 23 is extendable under the chest C of the dog D behind the front legs L1, L2 thereof and connectable to the back strap 24 adjacent to the opposite ends 36, 38 thereof. The opposite ends 23A, 23B of the lower chest strap 23 and the lower opposite ends 36, 38 of the upper back strap 24 have means thereon for releasably fastening them together. In the illustrated example, such fastening means are complementary patches 40, 42 of hook and loop fastening material marketed under the trademark Velcro. As seen in FIG. 6, the opposite ends 34A, 34B of the lower chest strap 23 are trimmed off at reverse acute angles relative to one another such that when they are attached to the lower opposite ends 36, 38 of the upper back strap 24, the lower chest strap 23 extends downwardly and rearwardly at an angle to the upper back strap 24 and behind the front legs L1, L2 of the dog D.

The protective garment 20 is worn by inserting the dog's front legs L1, L2 through the leg holsters 26, 28 until the respective top edges 26c, 28c are placed about the upper front leg portions and the respective bottom edges 26d, 28d are placed about the lower front leg portions of the dog D. The upper back strap 24 is next brought up over the dog's head H and is fitted around the dog's back B and shoulders S for the maximum comfort of the dog D in wearing the protective garment 20. The lower chest strap 23 is then positioned under the chest C and behind the front legs L1, L2 of the dog D and attached to the lower opposite ends 36, 38 of the upper back strap 24. The protective garment 20 can be fabricated in a variety of sizes depending on the size of the particular animal concerned. The fabric is machine-washable for easy maintenance and repeated wear by the dog during its everyday household life.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A protective garment for an animal's front legs, comprising:
   (a) an elongated back strap fittable over the back and shoulders of an animal;
   (b) a pair of leg holsters attached to opposite ends of said back strap and being tapered so as to fit around the front knees adjacent upper and lower front leg areas of the animal such that such areas are protected from direct contact with a surface upon which a dog may be lying so as to prevent callus development on and minimize hair loss from such areas of the animal; and
   (c) means extendable under the chest of the animal behind the front legs thereof for interconnecting said back strap adjacent to said opposite ends thereof;
   (d) said back strap and leg holsters being formed integrally with one another from a blank of continuous length flexible material having a pair of opposite end portions, said back strap being a middle portion of said blank extending between said opposite end portions of said blank, said leg holsters being formed by turning said opposite end portions of said blank inwardly and circumferentially and attaching said opposite end portions of said blank to said opposite ends of said back strap.

2. The garment of claim 1 wherein said blank of continuous length flexible material is stretchable and double-layered fabric.

3. The garment of claim 1 wherein said interconnecting means is an elongated chest strap.

4. The garment of claim 3 further comprising: means attached on said opposite ends of said chest strap and adjacent said opposite ends of said back strap for releasably fastening said chest strap and back strap together.

5. The garment of claim 4 wherein releasable fastening means includes complementary patches of hook and loop fastening material.

6. The garment of claim 1 wherein each of said leg holsters has a central passageway extending therethrough between opposite top and bottom edges thereof.

7. The garment of claim 1 wherein each of said leg holsters is conically tapered such that the circumference of said top edge thereof is greater than that of said bottom edge thereof.

8. A protective garment for an animal's front legs, comprising:
   (a) an elongated back strap fittable over the back and shoulders of an animal;
   (b) a pair of leg holsters attached to opposite ends of said back strap and being tapered so as to fit around the front knees adjacent upper and lower front leg areas of the animal such that such areas are protected from direct contact with a surface upon which a dog may be lying so as to prevent callus development on and minimize hair loss from such areas of the animal; and
   (c) an elongated chest strap extendable under the chest of the animal behind the front legs thereof for interconnecting said back strap adjacent to said opposite ends thereof;
   (d) said back strap and leg holsters being formed integrally with one another from a blank of continuous length fabric having a pair of opposite end portions, said leg holsters being formed by turning said opposite end portions of said blank inwardly and circumferentially and attaching said opposite end portions of said blank by stitching to said respective opposite ends of said back.

9. The garment of claim 8 wherein said blank of continuous length fabric is stretchable and double-layered.

10. The garment of claim 8 wherein said elongated back strap is a continuous sheet portion of said blank having inside and outside surfaces and extending between opposite pairs of front and back and side edges.

11. The garment of claim 8 wherein each of said leg holsters has a central passageway extending therethrough between opposite top and bottom edges thereof.

12. The garment of claim 8 wherein each of said leg holsters is conically tapered such that the circumference of said top edge thereof is greater than that of said bottom edge thereof.

* * * * *